US012743697B2

(12) United States Patent
Groarke et al.

(10) Patent No.: US 12,743,697 B2
(45) Date of Patent: Sep. 22, 2026

(54) IMPLEMENTING FRAUD CONTROLS ON A HYBRID NETWORK

(71) Applicant: MASTERCARD INTERNATIONAL INCORPORATED, Purchase, NY (US)

(72) Inventors: Peter Groarke, Dublin (IE); Ionut Nistor, Dublin (IE); Ahmed Hosny, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 683 days.

(21) Appl. No.: 16/277,156

(22) Filed: Feb. 15, 2019

(65) Prior Publication Data

US 2020/0034844 A1 Jan. 30, 2020

(51) Int. Cl.
*G06Q 20/40* (2012.01)
*G06F 17/18* (2006.01)

(52) U.S. Cl.
CPC ......... *G06Q 20/4016* (2013.01); *G06F 17/18* (2013.01); *G06Q 20/4014* (2013.01); *G06Q 20/4097* (2013.01)

(58) Field of Classification Search
CPC .. G06Q 20/40; G06Q 20/401; G06Q 20/4014; G06Q 20/4016; G06Q 20/4097; G06Q 20/409; G06F 17/10; G06F 17/18
See application file for complete search history.

(56) References Cited

U.S. PATENT DOCUMENTS 8,175,961 B2 * 5/2012 Reid ...................... G06Q 30/02 705/38
2004/0088298 A1 * 5/2004 Zou ......................... G06F 16/27
(Continued)

OTHER PUBLICATIONS

Herbst-Murphy, Susan, Clearing and Settlement of Interbank Card Transactions: A MasterCard Tutorial for Federal Reserve Payments Analysts Federal Reserve Bank of Philadelphia, https://www.philadelphiafed.org/-/media/frbp/assets/consumer-finance/discussion-papers/d-2013-october-clearing-settlement.pdf (Year: 2013).*
(Continued)

*Primary Examiner* — Jay Huang
(74) *Attorney, Agent, or Firm* — Buckley, Maschoff & Talwalkar LLC

(57) ABSTRACT

A computer implemented method of assessing the probability of fraudulent activity in an account to account payment is provided. The method comprises determining, based on previous credit balance settlement transactions between a first account and a card settlement account, that a first set of payment credentials is associated with the first account. It is determined that a second set of payment credentials are associated with the merchant account. A database comprising historical data indicating details of past payment transactions between the holder of the first set of payment credentials to the holder of the second set of payment credentials is accessed. A fraud probability engine is used to generate, based on the historical data, a fraud probability value for a transaction from a first account to a second account, wherein the fraud probability value is an estimate of the probability of the transaction being fraudulent.

6 Claims, 5 Drawing Sheets

(56) References Cited

U.S. PATENT DOCUMENTS

| | | | | |
|---|---|---|---|---|
| 2004/0254848 | A1* | 12/2004 | Golan | G06Q 20/12 705/26.1 |
| 2005/0177510 | A1* | 8/2005 | Hilt | G06Q 20/10 705/40 |
| 2006/0229961 | A1* | 10/2006 | Lyftogt | G06Q 20/108 707/999.1 |
| 2010/0030688 | A1* | 2/2010 | Patterson | G06Q 20/40 705/44 |
| 2014/0250011 | A1 | 9/2014 | Weber | |
| 2014/0279513 | A1* | 9/2014 | Dodds-Brown | G06Q 20/4016 705/44 |
| 2015/0227936 | A1* | 8/2015 | Bruesewitz | G06Q 20/04 705/44 |
| 2016/0210633 | A1* | 7/2016 | Epelman | G06Q 20/4016 |
| 2017/0011403 | A1* | 1/2017 | Nidamanuri | G06Q 20/4016 |
| 2017/0140385 | A1 | 5/2017 | Dobson et al. | |
| 2017/0300881 | A1* | 10/2017 | Weinflash | G06Q 20/386 |
| 2019/0251544 | A1* | 8/2019 | D'Agostino | G06Q 20/3224 |
| 2019/0364426 | A1* | 11/2019 | Muthukrishnan | G06Q 20/4016 |
| 2021/0357885 | A1* | 11/2021 | Nayak | G06F 16/2455 |

OTHER PUBLICATIONS

"Communication: Extended European Search Report", European Patent Office, Apr. 6, 2018 (Apr. 6, 2018), for European Application No. 18159022.5-1217, 7pps.

* cited by examiner

IMPLEMENTING FRAUD CONTROLS ON A HYBRID NETWORK

CROSS-REFERENCE TO RELATED APPLICATION

This application is a U.S. National Stage filing under 35 U.S.C. § 119, based on and claiming benefits of and priority to European Patent Application No. 178159022.5 filed on Feb. 27, 2018. The entire disclosure of the above application is incorporated herein by reference.

FIELD OF INVENTION

The present disclosure relates to a method for implementing fraud controls in a payment network that operates using payment card based processes and account based processes.

BACKGROUND

It is important in many industries that fraudulent transfers of data are able to be detected and prevented. Fraudulent transfers of data may include the downloading of private documents by unauthorized parties, unauthorized payment transactions, or any other transfers of data without the permission of the party to whom the data belongs.

Many methods and systems exist for preventing fraudulent access to and transfers of data, including password protection, encryption protocols and advanced identify verification processes.

In some methods of preventing fraudulent transfers of data, a history of previous data transfers is used to determine the likelihood of a given data transfer being fraudulent. If, for example, a given sender has legitimately transferred data to a given beneficiary on several occasions in the past, a future transfer of data from the sender to the beneficiary may be considered less likely to be fraudulent than a transfer to a new recipient.

A problem with such methods of fraud control is that it is not possible to provide an accurate probability for the likelihood of a data transfer being fraudulent before a history of previous data transfers has been established. This problem may occur, for example, if a user who has a history of data transfers from a particular data transfer account attempts to perform a transfer of data from a new account. Because the new account has no associated history of previous data transfers, it is not possible to determine the likelihood of a transaction from the new account being fraudulent.

An important example of this problem occurs within the field of data transfers relating to payment transactions.

Data transfers that form part of a payment transaction may be processed according to several methods. A first method form of data transfers occurs when payments made using a payment card are processed, such as a debit card payment or a credit card payment. In data transfers of this type, the sender is identified by an identifier associated with the payment card and the beneficiary is identified with a merchant identifier (which is an identification code registered for use in receiving card payments). Such payments are very common and a large volume of historical data has been gathered for use in preventing fraudulent activity.

A second method of data transfer that may form part of a payment transaction occurs when a payment is transferred directly from one account to another account. In data transfers of this type, the sender and beneficiary are both identified by respective account numbers associated with the respective accounts of the transfer. Such transfers are less common and, as a result, there is a lower volume of available historical data from which to determine the likelihood of a given transfer being fraudulent.

Account to account payment transactions and payment card transactions are currently processed on separate and distinct networks each with their own protocols and data structures. Accordingly, the transfer of data between such networks encounter the technical problem of a lack of interoperability between them. Such transfer of data is particularly, but not exclusively, important in relation to using disparate identifiers on each system to establish a relationship between parties to a transaction such that potential fraudulent transactions can be identified, or indeed that valid, non-fraudulent transactions can be identified.

As account to account transfers are becoming more common, there is an increasing need to provide a method of providing an estimate for the likelihood of such data transfers being fraudulent without the requirement of a large volume of historical data relating to previous data transfers of that type.

SUMMARY OF INVENTION

According to a first aspect, there is provided a computer implemented method of assessing the probability of fraudulent activity in an account to account payment, the method comprising: determining, based on previous credit balance settlement transactions between a first account and a card settlement account, that a first set of payment credentials is associated with the first account; determining, based on settlement transactions between an acquirer account and a merchant account, that a second set of payment credentials are associated with the merchant account; accessing a database comprising historical data indicating details of past payment transactions between the holder of the first set of payment credentials to the holder of the second set of payment credentials;

generating, using a fraud probability engine, based on the historical data, a fraud probability value for a transaction from a first account to a second account, wherein the fraud probability value is an estimate of the probability of the transaction being fraudulent.

By using determining that a first set of payment credentials is associated with a first account and that a second set of payment credentials is associated with a merchant account, it is possible to use data relating to transactions between the first set of payment credentials and the second set of payment credentials in order to determine whether a transaction from the first account to the merchant account is likely to be fraudulent. Such a method is particularly useful when a large volume of data is available in relation to transactions between the first and second set of payment credentials, but little data is available in relation to transactions between the first account and the merchant account.

In some examples, the method comprises receiving a request to process the transaction from the first account to the second account, wherein the step of generating a fraud probability value is in response to the request to process the transaction.

In some examples, the step of generating a fraud probability value is based also on further data in the request to process the transaction, wherein the further data comprises information indicating one or more of: a transaction value, and a transaction time.

In some examples, the method further comprises determining that the transaction has a high probability of being fraudulent, and upon determining that the transaction has a high probability of being fraudulent, declining the transaction.

In some examples, the step of determining that a first set of payment credentials is associated with the first account comprises: identifying a correlation between credit account balance debts incurred in relation to the first set of payment credentials and settlement payments from the first account.

In some examples, the step of determining that a first set of payment credentials is associated with the first account comprises: determining that data associated with a transaction from the first account to a card settlement account comprises an indication that the transaction is in relation to a card account associated with the first set of payment credentials.

In some examples, the step of determining that a second set of payment credentials are associated with the merchant account comprises: generating expected settlement amounts based on previous transaction authorizations made to a merchant with the second set of payment credentials; identifying, based one or more settlement transactions from the acquirer account to the merchant account, a correlation between expected settlement amounts and the one or more settlement transactions.

In some examples, the database comprising historical data indicating details of past payment transactions between the holder of the first set of payment credentials to the holder of the second set of payment credentials is a database comprising historical data indicating details of a plurality of past pull payment transactions, each being between one of a plurality of payment card holders and one of a plurality of merchants.

In some examples, the transaction from the first account to the second account for which a fraud probability value is generated is a push transaction.

In some examples, identifying a correlation between credit account balance debts incurred in relation to the first set of payment credentials and settlement payments from the first account comprises: retrieving, from a push transaction database, data relating to settlement payments from a plurality of payment accounts to a credit card settlement account; retrieving, from a pull transaction database, data relating to payments made using the first set of payment credentials; and determining that the amount of the payments made using the first set of payment credentials in a first time period during a specified time period is the same as the amount of a settlement transaction made with respect to credit card payments made in the specified time period.

In some examples, the fraud probability value is a Boolean data value, indicating either a high probability of fraud or a low probability of fraud.

In some examples, the fraud probability value provides likelihood of the transaction being fraudulent as a percentage.

In a second aspect, a computer system is provided, the computer system comprising: a payment processor, a previous transaction database comprising details of past payment transactions, a fraud probability engine, and at least one communication node, the computer system configured to perform the steps of: determining, based on previous credit balance settlement transactions between a first account and a card settlement account, that a first set of payment credentials is associated with the first account; determining, based on settlement transactions between an acquirer account and a merchant account, that a second set of payment credentials are associated with the merchant account; accessing the previous transaction database to obtain details of past payment transactions between the holder of the first set of payment credentials to the holder of the second set of payment credentials; generating, using a fraud probability engine, based on the details of past payment transactions, a fraud probability value for a transaction from a first account to a second account, wherein the fraud probability value is an estimate of the probability of the transaction being fraudulent.

BRIEF DESCRIPTION OF THE FIGURES

Aspects of the present invention will now be described by way of example with reference to the accompanying Figures. In the Figures.

DETAILED DESCRIPTION OF EMBODIMENTS OF THE INVENTION

The following description is presented to enable any person skilled in the art to make and use the system, and is provided in the context of a particular application. Various modifications to the disclosed embodiments will be readily apparent to those skilled in the art.

The method and systems described below allow the likelihood of a data transfer to be determined based on historical data relating to another type of transaction. In particular, a payment card number associated with a first bank account is identified and a merchant identifier associated with a second bank account is identified. Historical data relating to previous transactions using the payment card number and the merchant identifier is used to provide an estimate of the likelihood of a transfer from the first account to the send account being fraudulent.

Figure 1:
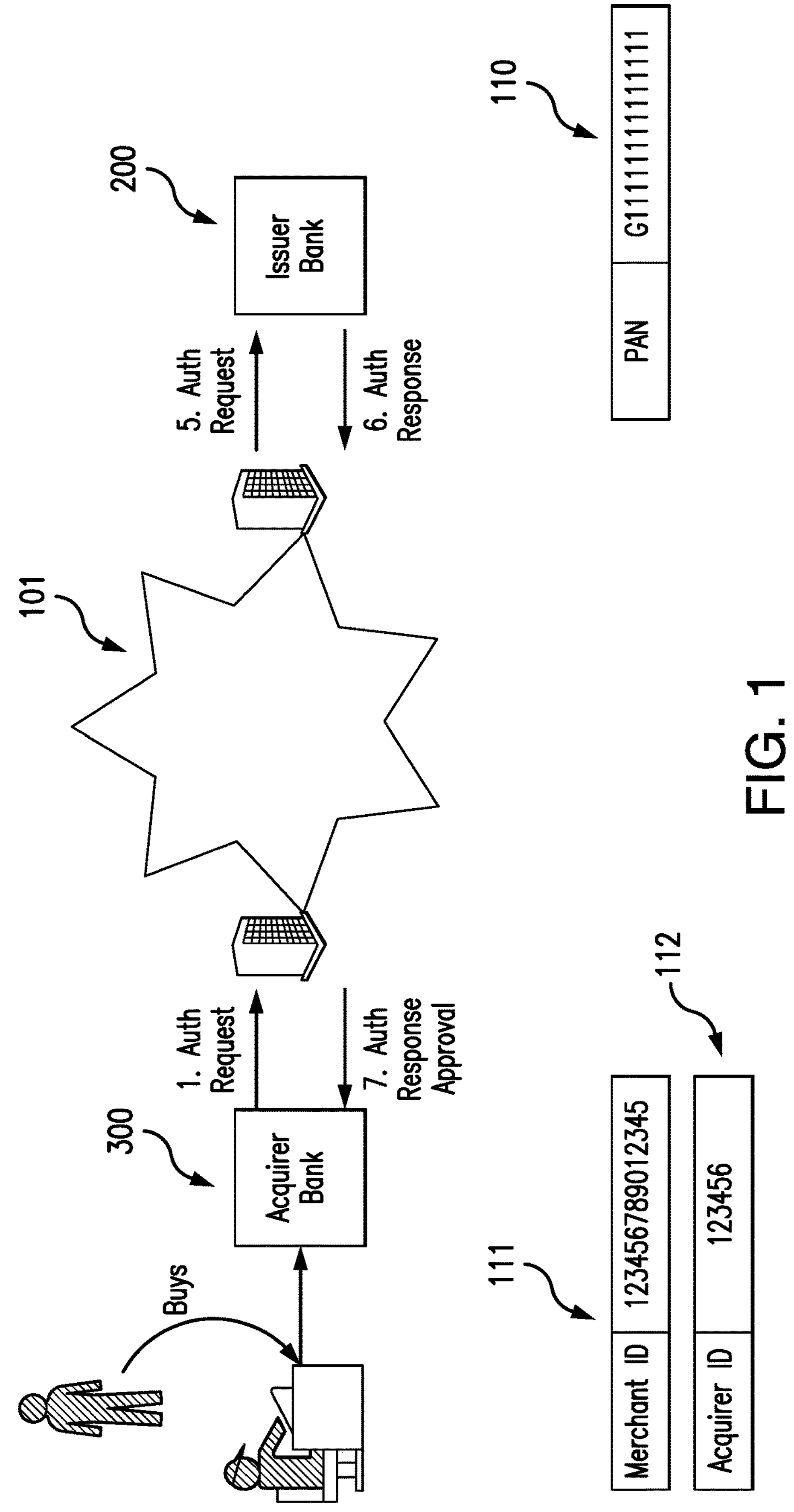
FIG. 1 is a schematic representation of the entities involved in a pull messaging transaction.

FIG. 1 shows a schematic illustration of elements involved in the processing of payment card transactions between a cardholder and a merchant, such as credit card transactions or debit card transactions.

The cardholder has a first account at a first financial institution 200 (hereafter referred to as the issuing institution). The merchant has a second account at a second financial institution 300 (hereafter referred to as the acquiring institution).

Both the cardholder and the merchant are registered with a payment processing network 101 used to process payment transfers and payment authorizations between entities registered with the payment processing network 101. Cardholders are identified by the payment processing network 101 by a digital identifier, which is usually associated with a payment card. This identifier is hereafter referred to as a primary account number, PAN. Merchants are identified by the payment processing network by further identifier, hereafter referred to as a merchant identifier.

When a cardholder wishes to make a payment to a merchant in exchange for goods or services, this can be initiated according a payment messaging protocol. A cardholder beings by providing his PAN to the merchant. A sequence of encrypted messages is transferred in turn from the merchant to the acquiring institution 300 to the payment processing network 101 to the issuing institution 200. The purpose of these messages is to request a guarantee of a future payment from the cardholder's bank account at the issuing institution 200 to the merchant's bank account at the acquiring institution 300. During a successful payment authorization, the issuing institution 200 returns an approval message in response to the first sequence of message in the reverse order, i.e. from the issuing institution 200 to the payment processing network 101 to the acquiring institution 300 to the merchant. The result of the second series of messages is to guarantee a payment from the cardholder's bank account to the merchant's bank account at a future time. On receiving such a guarantee, the merchant may allow the cardholder to take possession of any good in relation to which the payment has been made.

Such payment systems as described above are herein termed Pull Payments.

The form of the encrypted messages sent within the above sequence is typically in accordance with an agreed messaging standard for financial transaction messaging, such is ISO 8583. In the ISO 8583 the merchant identifier can be considered to be indicated by the DE32 and DE42 data elements.

During the messaging sequence described above, the payment processing network 101 can generate data entries in which details of the transaction are stored in a previous pull transaction database to be referred to in the future. For example, the data entries may comprise data corresponding to the merchant identifier, 111, the PAN 110, the payment amount, and any other information obtainable from the authorization request and response messages. The data entries in the previous pull transaction database may also include a flag indicating whether the transaction was disputed or discovered to be fraudulent.

Figures 2, 3:
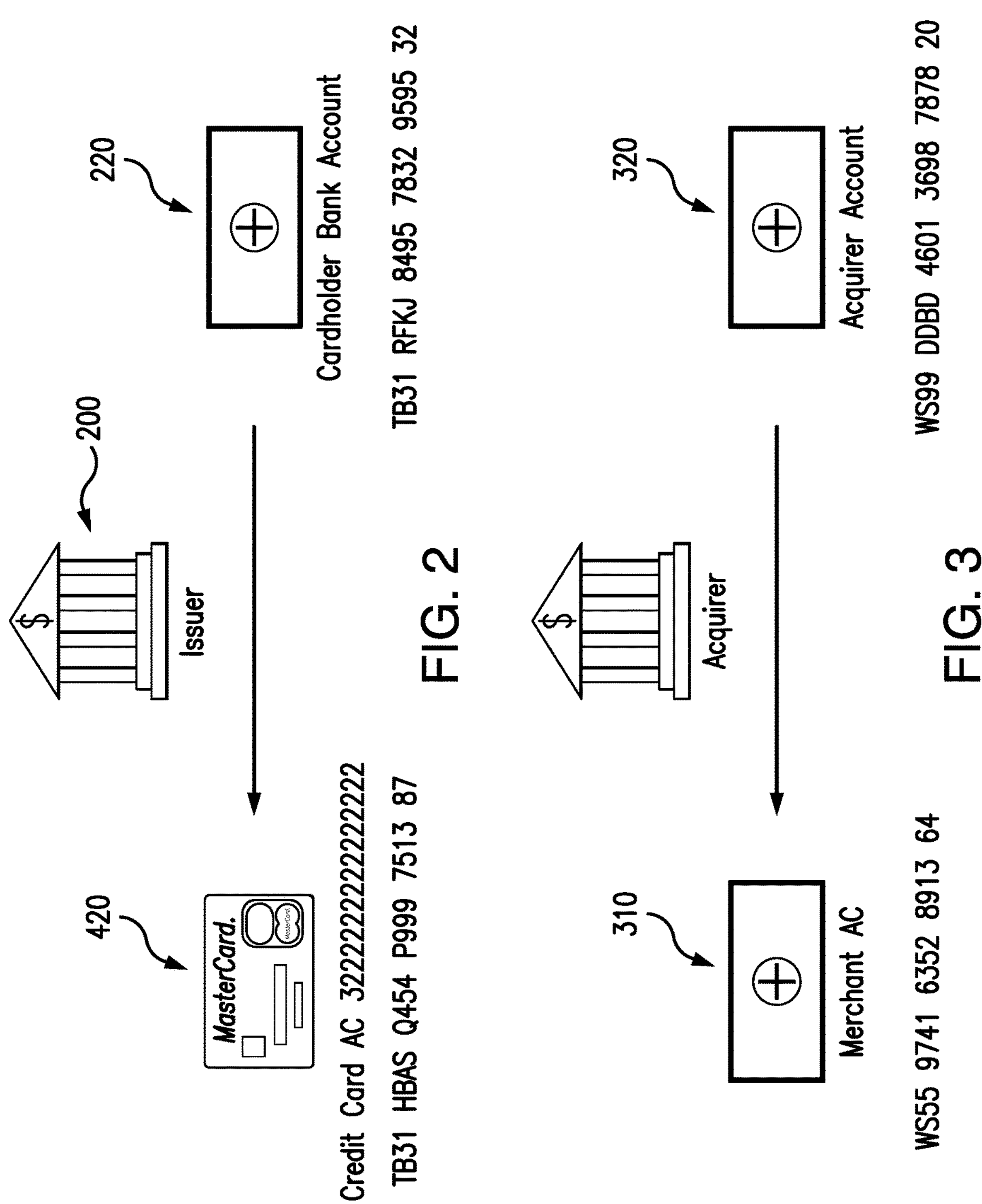
FIG. 2 is a schematic representation of a data exchange in a push transaction relating to a card settlement payment.
FIG. 3 is a schematic representation of a data exchange in a push transaction between an acquirer account in an acquiring institution and a merchant account in the acquiring institution.
Figure 4:
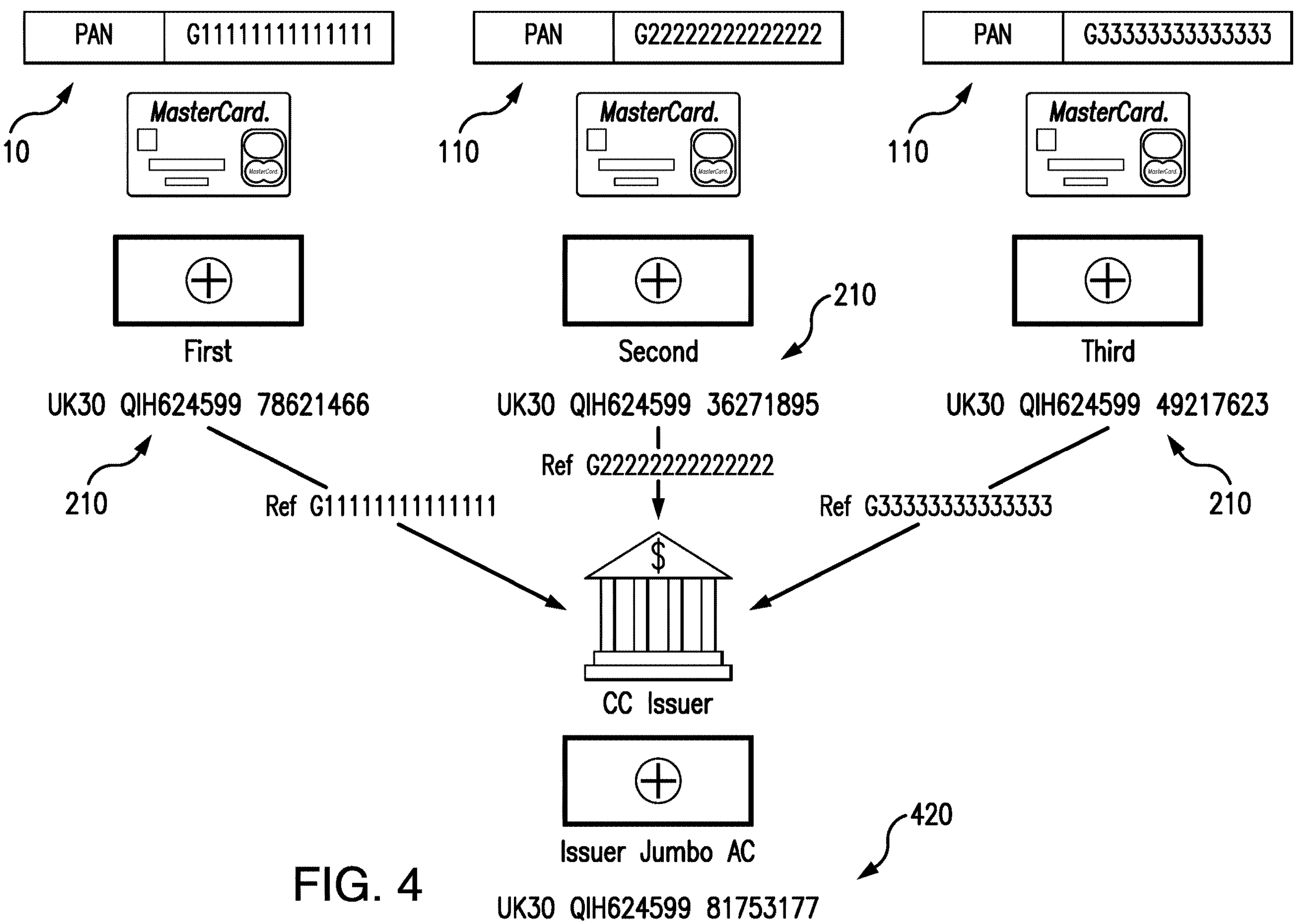
FIG. 4 is a schematic representation of data exchanges in relation to multiple card settlement payments from different accounts made to a single issuer account.

Another type of payment process is illustrated in FIGS. 2, 3 and 4.

In such a transaction, a payment is made directly from one bank account to another bank account. A payment is authorized in advanced by a sender, and then a data transfer flows from a financial institution associated with the sender to a financial institution associated with the beneficiary of the transfer.

Such account to account payments are hereafter termed Push Payments.

In such a payment, the processor of the payment identifies the relevant accounts by account numbers at the respective financial institutions.

FIG. 2 illustrates the use of a push payments in relation to the settlement of a credit card balance. In such a transaction, a payment is made from the bank account 210 of a cardholder of a credit card to an account 420 operated associated by a credit card provider. In such a transaction, the processor of the transaction is provided with an identifier for the account 210 of the cardholder, an identifier for the account 420 associated with the credit card provider.

FIG. 3 illustrates the use of push payments in relation to the settlement to a merchant account 310 from an acquiring institution organization account 320.

In this example, both the sending and receiving accounts belong to the same financial institution. The acquiring institution organization account 320 is used to receive pushed transactions from other issuing financial institutions as settlements of earlier authorized pull transactions from cardholders at having accounts as the issuing institutions to merchants having the accounts at the acquiring institution. The acquiring institution receives regular payments into the acquiring institution organization account 320, with each payment being in relation to multiple earlier authorizations to multiple merchants having accounts at the acquiring institution. The acquiring institution apportions payments received into the acquiring institution organization account 320 according to its records of which merchants have been guaranteed payments during pull payment authorizations. The payments are then transferred from the acquiring institution organization account 320 to the merchant accounts in push transactions as shown in FIG. 3.

Similarly to the push transaction settlement process described in FIG. 3, push transaction settlements of credit card balances (as described with reference to FIG. 2) belonging to multiple different cardholders are made to a single account 420 associated with the credit card issuer. The settlement transaction messages comprise a PAN as a reference in a data field of the message in order to identify the payment card to which the settled balance relates.

Processors of the payment processes described with reference to FIGS. 2, 3 and 4 may store data relating to previous transactions in a push transaction database. Such a database may be used to predict the likelihood of a future push transaction being fraudulent. However, the push transaction have previously made with significantly lower volume that pull transactions. As such, push transaction databases may include less data with which to predict the likelihood of a transaction being fraudulent.

Figure 5:
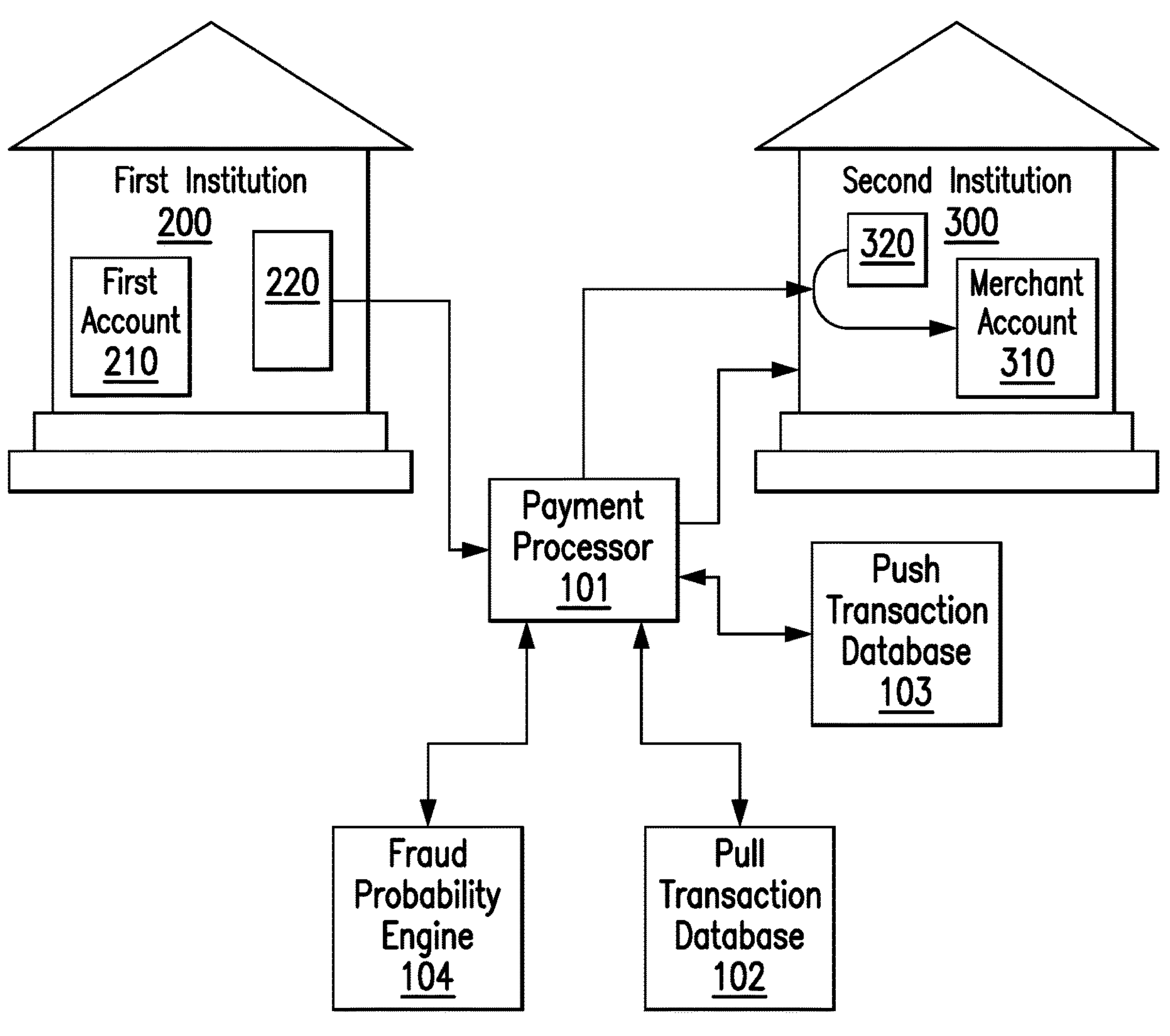
FIG. 5 is a schematic representation of a system suitable for performing examples of the disclosure.

FIG. 5 illustrates a system in which a hybrid payment processing system 101 processes both push transactions and pull transactions.

The system uses data obtained during previous push transactions and previous pull transactions to identify an account 210 at an issuing institution 200 with a payment card PAN and to identify an account 310 at an acquiring institution 300 with a merchant identifier used during pull transactions.

The payment processor 101 is operatively linked to a pull transaction database 102, in which data relating to previously processed pull transactions is stored, and a push transaction database 103, in which data relating to previous push transactions are stored.

The payment processor 101 is also linked to a fraud probability engine which provides an estimate of the likelihood of an attempted transaction being fraudulent.

In order to estimate the likelihood of an attempted push transaction being fraudulent, the payment processor receives as an input data relating to the transaction, such as the account number of the sender, the account number of the beneficiary, the value of the transaction, and data from one or both of the push transaction database 103 and the pull transaction database 102. The fraud probability engine 104 provides as an output an estimate of the transaction being fraudulent, which may be in the form of a percentage, a score, a binary assessment ("fraudulent" or "not fraudulent", for example), or any other suitable output.

The estimate of the likelihood of the transaction being fraudulent is based on the history of transactions between the sender and the beneficiary. Where there is a history of a sender having made many uncontested transactions to a beneficiary, the fraud probability engine 104 may estimate a low likelihood of a future transaction between the same sender and beneficiary being fraudulent. Other criteria, such as the size of the transaction and time of the transaction may be used to determine the likelihood of the transaction being fraudulent and may be compared with previous transactions. The fraud probability engine 104 may use machine learning methods to generate an algorithm for providing an estimate of a transaction being fraudulent based on past transactions.

Figure 6:
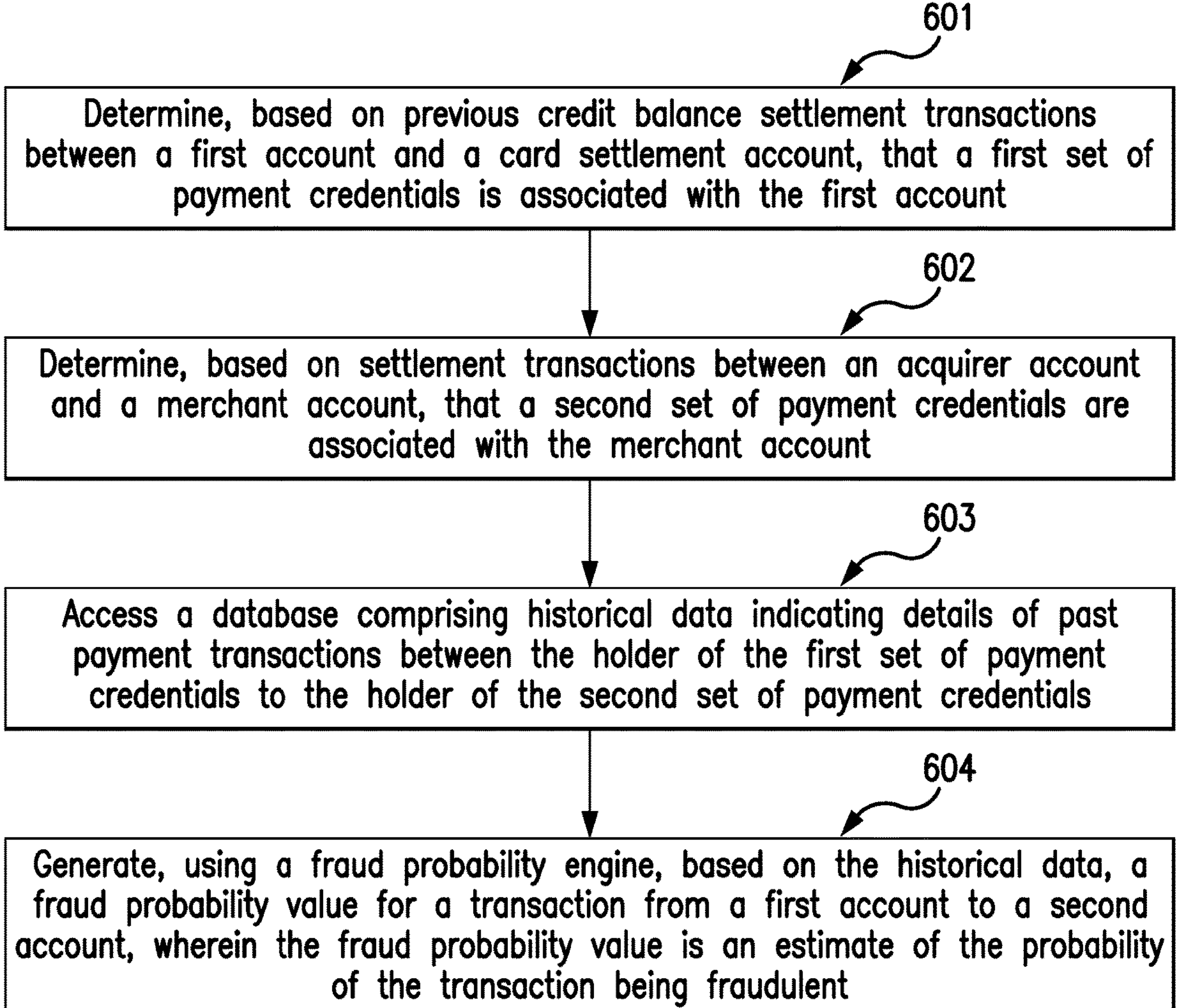
FIG. 6 is a flow diagram representing steps performed in assessing the probability of fraudulent activity in an account to account payment in examples of the disclosure.

FIG. 6 is a flow diagram showing a method of assessing the probability of a transaction being fraudulent in accordance with the present disclosure.

In step 601, the payment processor determines, based on previous credit balance settlement transactions between a first account and a card settlement account, that a first set of payment credentials (a payment card PAN) is associated with the first account.

The payment processor may determine that the first set of payment credentials is associated with the first account by analysing the contents of push payments to an account of a credit card provider, as shown in FIG. 2 or 4.

For example, the payment processor 101 may have stored in the push transaction database 103 records of transactions from the first account to a credit card provider. The data records may comprise a digital reference indicating the card PAN to which the settlement is being made in relation to. The payment processor 101 may then associate the first account with the card PAN in the settlement payment reference.

Alternatively, the payment processor 101 may have stored in the pull transaction database 102 references of transactions made using a credit card with a first set of payment credentials. The payment processor may then correlate monthly pushed settlements from a first account as recorded in the push transaction database 103 with payments made in the respective months with a credit card with the first set of payment credentials. In other words, the payment processor 101 may determine that payments made in push transactions from the first account to a credit card provider account are being made to settle a balance incurred with pull transactions with the first set of payment credentials.

In step 602, the payment processor determines that the merchant account is associated with a merchant identifier (second set of payment credentials) used in pull transactions.

The payment processor may determine that the merchant account is associated with the merchant identifier by identifying a correlation between pull transaction authorizations made using the merchant identifier and push transaction transactions made to the merchant account.

For example, payment processor 101 may have stored in the push transaction database 103 records of push transactions from the acquiring institution organization account 320 to the merchant's account 310. The payment processor 101 may also have stored in the pull transaction database 102 records of pull transactions authorizing payments to the merchant identifier. By correlating the dates and amounts of the pull transactions and the push transactions, the payment processor may determine that a first set of push transactions to the merchant's account relate to settlements made in relation to a first set of pull transactions made to the merchant identifier. In this way, the payment processor is able to determine that a given merchant identifier is associate with a given merchant account.

In step 603, the payment processor accesses the pull transaction database to access data relating to pull transactions from the first set of payment credentials to the merchant identifier.

Because it has been established that the first account is associated with the first set of payment credentials and the merchant account is associated with the second set of payment credentials, the payment processor can use data relating to historical transactions using the first and second set of payment credentials to estimate the probability of a transaction from the first account to the merchant account being fraudulent.

In step 604, the payment processor uses the fraud probability engine to generate, based on the historical data relating to transactions relating to the first and second set of payment credentials, a fraud probability value for a transaction from the first account to the merchant account, wherein the fraud probability value is an estimate of the probability of the transaction being fraudulent.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

The invention claimed is:

1. A computer implemented method of assessing the probability of fraudulent activity during a payment transaction between a cardholder having a first account and a merchant having a merchant account, the method comprising:

receiving, by a payment processor of a hybrid payment processing system operable to process both push transactions and pull transactions, a push transaction request to process a push payment transaction from a first account at an issuing institution of a cardholder to a merchant account of a merchant at a separate, acquiring institution;

determining, by the payment processor, that a first set of payment credentials is associated with the first account by identifying a correlation between credit account balance debts incurred in relation to the first set of payment credentials and settlement payments from the first account;

determining, by the payment processor, that a second set of payment credentials are associated with the merchant account by:

generating expected settlement amounts based on previous transaction authorizations made to the merchant with the second set of payment credentials, and identifying, based one or more settlement transactions from an acquirer account to the merchant account, a correlation between expected settlement amounts and the one or more settlement transactions;

accessing, by the payment processor, a pull transaction database comprising pull payment transaction historical data indicating details of a plurality of past pull payment transactions between a plurality of cardholders and a plurality of merchants, and wherein a flag is associated with each fraudulent past pull payment transaction in the pull transaction database;

accessing, by the payment processor, a push transaction database comprising push payment transaction historical data that is distinct from the pull payment transaction historical data, the push payment transaction historical data indicating details of past push payment transactions between the plurality of cardholders and their payment card providers;

generating, by the payment processor using a fraud probability engine and based on the push transaction historical data and the pull transaction historical data and a transaction value, a fraud probability value for the push payment transaction from the first account to the merchant account, wherein the fraud probability value is an estimate of the probability of the push payment transaction being fraudulent;

determining, by the payment processor based on the fraud probability value, that the push payment transaction has a high probability of being fraudulent; and declining, by the payment processor, the push payment transaction.

2. The computer implemented method of claim 1, wherein generating a fraud probability value further comprises basing, by the payment processor, the fraud probability value at least in part on a transaction time.

3. The computer implemented method of claim 1, wherein identifying a correlation between credit account balance debts incurred in relation to the first set of payment credentials and settlement payments from the first account comprises:

retrieving, by the payment processor from a push transaction database, data relating to settlement payments from a plurality of payment accounts to a credit card settlement account;

retrieving, by the payment processor from a pull transaction database, data relating to payments made using the first set of payment credentials; and determining, by the payment processor that the amount of the payments made using the first set of payment credentials in a first time period during a specified time period is the same as the amount of a settlement transaction made with respect to credit card payments made in the specified time period.

4. The computer implemented method of claim 1, wherein the fraud probability value is a Boolean data value.

5. The computer implemented method of claim 1, wherein the fraud probability value provides likelihood of the transaction being fraudulent as a percentage.

6. A hybrid payment processing computer system operable to process both push transactions and pull transactions and to assess the probability of fraudulent activity during a payment transaction between a cardholder having a first account and a merchant having a merchant account comprising:

a payment processor, a pull transaction database comprising details of past pull payment transactions, a push transaction database comprising details of past push payment transactions, wherein the push transaction database is separate from the pull transaction database;

a fraud probability engine, and at least one communication node, the computer system configured to perform the steps of:

receiving a request to process a push payment transaction from a first account at an issuing institution of a cardholder to a merchant account of a merchant at a separate, acquiring institution;

determining that a first set of payment credentials is associated with the first account by identifying a correlation between credit account balance debts incurred in relation to the first set of payment credentials and settlement payments from the first account;

determining that a second set of payment credentials are associated with the merchant account by:

generating expected settlement amounts based on previous transaction authorizations made to the merchant with the second set of payment credentials, and identifying, based one or more settlement transactions from an acquirer account to the merchant account, a correlation between expected settlement amounts and the one or more settlement transactions;

accessing the pull transaction database comprising pull payment transaction historical data indicating details of a plurality of past pull payment transactions between a plurality of cardholders and a plurality of merchants, and wherein a flag is associated with each fraudulent past pull payment transaction;

accessing the push transaction database comprising push payment transaction historical data that is distinct from the pull payment transaction historical data, the push payment transaction historical data indicating details of past push payment transactions between the plurality of cardholders and their payment card providers;

generating, by the payment processor using the fraud probability engine and based on the push payment transaction historical data, the pull payment transaction historical data and based on a transaction value, a fraud probability value for the push payment transaction from the first account to the merchant account, wherein the fraud probability value is an estimate of the probability of the push payment transaction being fraudulent;

determining, based on the fraud probability value, that the push payment transaction has a high probability of being fraudulent; and declining the push payment transaction.

* * * * *